Jan. 18, 1938.   J. W. BROUGHER   2,106,113
VEHICULAR TRAFFIC SIGNAL
Filed March 11, 1936   2 Sheets-Sheet 1
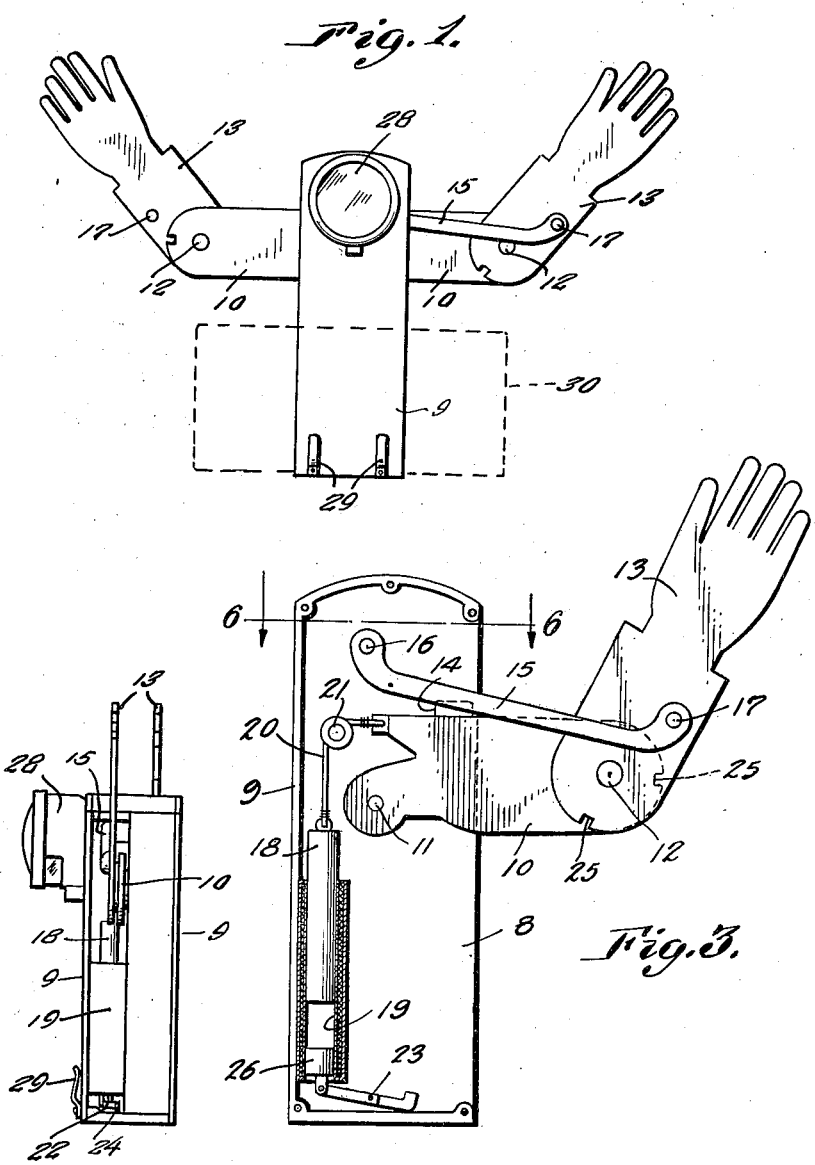

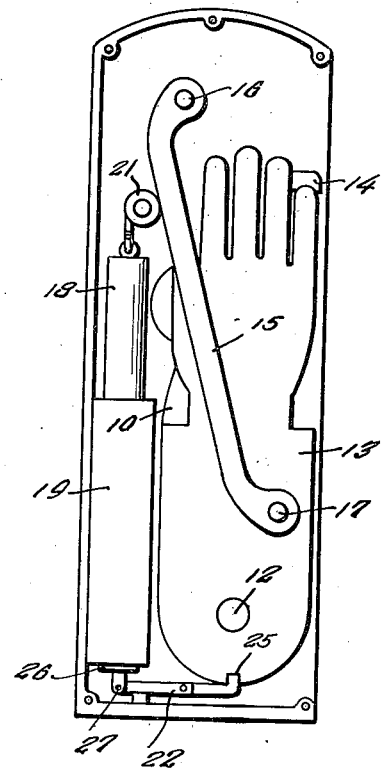
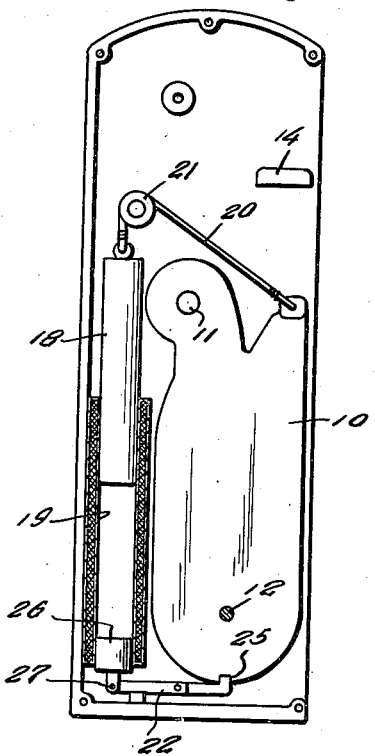
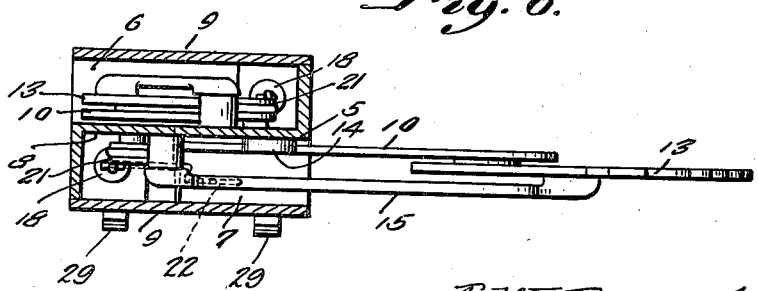

Patented Jan. 18, 1938

2,106,113

UNITED STATES PATENT OFFICE 2,106,113

VEHICULAR TRAFFIC SIGNAL

John W. Brougher, Bremen, Ind.

Application March 11, 1936, Serial No. 68,341

1 Claim. (Cl. 177—329)

This invention relates to signals for use on automobiles and the like for indicating to drivers of other vehicles and to advise them of the intention of the operator of the automobile equipped with such a signal, as for example the intention of said operator either to stop, or to make a right or left turn.

The invention together with its objects and advantages will be best understood from a study of the following description taken in connection with the accompanying drawings wherein:

Figure 1 is an elevational view illustrating the use of the invention in indicating "Stop".

Figure 2 is a side elevational view of the invention.

Figure 3 is a detail view with one of the cover plates of the casing removed and showing one of the arms in an extended position.

Figure 4 is a view similar to Figure 3 with the arm in a folded or retracted position.

Figure 5 is a view similar to Figure 4 but with a hand section of the arm removed.

Figure 6 is a detail sectional view taken on the line 6—6 of Figure 3.

Referring to the drawings by reference numerals it will be seen that the signal which is particularly adapted to be mounted on a fixed rear portion of the automobile comprises an elongated casing 5 provided with two compartments 6 and 7 respectively separated by partition wall 8. One of the compartments, as for example, the compartment 6 opens at the left hand side of the casing while the other of the compartments, for example the compartment 7 opens at the right hand side of the casing as shown in Figure 6.

Also for each of the compartments 7 there is provided a removable cover plate 9. Plates 9 are adapted to be secured in position through the medium of bolts or in any other suitable manner as found desirable.

Arranged in each of the compartments 6, 7 is a signal device in the form of a simulated hand, and since the signal devices are identical in construction, it is thought that a detail description of one will teach the structure of the other. Thus, referring specifically to the signal device arranged in compartment 7, it will be seen that the same comprises what may be termed an arm section 10 of suitable shape and design pivoted to the partition wall 8 as at 11.

Pivoted to the arm section 10 as at 12 to fold relative to the arm section 10 is a hand section indicated by the reference numeral 13.

Upward movement of the arm section 10 is limited through the medium of a suitably arranged stop lug 14 while to effect folding or extension of the hand section 13 relative to the arm section 10 there is provided a link 15 having offset ends one of which is pivoted to the partition wall 8 as at 16 and the other end of which is pivoted to the hand section 13 as at 17.

From the above it will be seen that as the arm section 10 is caused to swing upwardly to the position shown in Figure 3 link 15 will act on the hand section 13 to swing the same to the position shown in Figure 3. Also when the arm section 10 is caused to swing downwardly to the position shown in Figure 4 link 15 will act on the hand section 13 to cause the same to swing inwardly to a folded parallel position with the arm section 10 as shown in said Figure 4.

For raising and lowering the arm section 10 there is provided an electromagnet 19 that includes a relatively long core 18 and a relatively short movable core 26. At its upper end the core 18 is connected through the medium of a flexible cable or the like 20 with the pivoted end of the arm 10, cable 20 being trained over a suitable sheath or pulley 21 suitably mounted within the compartment and as clearly shown in Figures 3, 4, and 5.

It will thus be seen that as the member 19 moves downwardly within the magnet 19 arm 10 will be caused to swing to the position shown in Figure 3 and at the same time, and in a manner previously explained, the hand section 13 will be caused to swing outwardly relative to the arm section 10 into the position shown in Figure 3 for indicating the desired signal.

For releasably locking the signal device in the position shown in Figure 3 there is provided a latch rod 22 pivoted in the lower end of the compartment as at 23 and said rod 22 has an angular end formed with an upstanding projection or lug 24 that is adapted to engage notches 25 provided in the edges of the arm sections 10 and 13 at the pivoted ends of said sections.

Mounted for sliding movement within the lower end of the magnet 19 is the relatively short magnet-plunger 26 which is pivoted to one end of the latch arm 22 as at 27. It will thus be seen that when the signal arm is in the folded position within the compartment of the casing lug 24 engages in the notches 25 in a manner to releasably hold the arms in this non-signaling postion within the compartment of the casing.

It will be understood that any suitable circuit and controlling means may be provided for the magnet 19. It will thus be seen that when the magnet is energized plunger 18 will move downwardly to swing the signal element to the signal indicating position shown in Figure 3 while plunger 26 will move upwardly for swinging the latch bar to the position shown in Figure 3 to release the arm whereby the latter may swing in response to the downward movement of the plunger 18 to the signal indicating position.

It will be further understood that in actual practice that when it is desired to signal a turn to either the right or to the left the plungers 18 and 26 associated with the proper arm only will be magnetized when swinging that arm to a signal indicating position. On the other hand when it is desired to indicate "Stop" the plungers 18 and 26 of both of the arms will be magnetized so that both of the arms will swing to the signal indicating position suggested in Figure 1.

Further in accordance with the present invention it is proposed to mount on the front wall 9 of the casing an electric signal lamp 28, and also to mount at the bottom of said front wall spring clips 29 for use in holding in proper position on the signal casing the license plate or the like suggested by broken lines in Figure 1 and indicated generally by the reference numeral 30.

It is thought that a clear understanding of the construction, utility and advantages of an invention of this character will be had without a more detail description.

Having thus described the invention, what is claimed as new is:

In an automobile signal, the combination with a housing having a compartment opening through one side of the housing, of a foldable signal arm including an arm section pivoted at one end to an inner wall of said compartment, a hand section pivoted at one end to the free end of the arm section, and a link having one end pivotally connected to said hand section, and having its opposite end pivotally connected to an inner wall of said compartment whereby to cause said hand section to move to a folded or unfolded position relative to the arm section incidental to a swinging of the arm section into or out of position within said compartment and means connected to the arm section for actuating the same.

JOHN W. BROUGHER.